United States Patent
Nguyen et al.

(10) Patent No.: US 9,008,189 B2
(45) Date of Patent: Apr. 14, 2015

(54) METHODS AND DEVICES FOR CONTEXT MODELING TO ENABLE MODULAR PROCESSING

(75) Inventors: Nguyen Nguyen, Waterloo (CA); Tianying Ji, Waterloo (CA); Dake He, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 518 days.

(21) Appl. No.: 13/354,448

(22) Filed: Jan. 20, 2012

(65) Prior Publication Data

US 2013/0188735 A1    Jul. 25, 2013

(51) Int. Cl.
| | |
|---|---|
| H04N 7/12 | (2006.01) |
| H04N 11/02 | (2006.01) |
| H04N 11/04 | (2006.01) |
| H04N 19/60 | (2014.01) |
| H04N 19/13 | (2014.01) |
| H04N 19/176 | (2014.01) |
| H04N 19/18 | (2014.01) |
| H04N 19/196 | (2014.01) |
| H04N 19/463 | (2014.01) |

(52) U.S. Cl.
CPC ......... *H04N 19/00775* (2013.01); *H04N 19/13* (2013.01); *H04N 19/176* (2013.01); *H04N 19/18* (2013.01); *H04N 19/196* (2013.01); *H04N 19/463* (2013.01); *H04N 19/60* (2013.01)

(58) Field of Classification Search
CPC ............................. H04N 7/50; H04N 7/26335
USPC ........................ 375/240.01, 240.25
See application file for complete search history.

(56) References Cited

U.S. PATENT DOCUMENTS

| | | | |
|---|---|---|---|
| 2008/0267513 A1 | 10/2008 | Sankaran | |
| 2013/0177070 A1* | 7/2013 | Seregin et al. | ........... 375/240.02 |

FOREIGN PATENT DOCUMENTS

| | | |
|---|---|---|
| CA | 2713143 | 8/2009 |
| WO | 2011128303 | 10/2011 |
| WO | 2011128303 A2 | 10/2011 |

OTHER PUBLICATIONS

Marpe, H. Schwarz, and T. Wiegand, "Context-based adaptive binary arithmetic coding in the h.264/AVC video compression standard," IEEE Transactions on Circuits and Systems for Video Technology, 13(7):620-636, Jul. 2003.

(Continued)

*Primary Examiner* — Chikaodili E Anyikire
(74) *Attorney, Agent, or Firm* — Rowand LLP

(57) ABSTRACT

Methods of encoding and decoding for video data are described for encoding or decoding coefficients for a transform unit. In particular, the significant-coefficient flags for a coefficient group are encoded and decoded based upon a context determination, and the context is determined based upon the values of neighboring flags. The neighborhood used to determine the context varies depending on whether the significant-coefficient flag to be encoded or decoded is in the right column or bottom row of the coefficient group or not. If it is in the right column or bottom row one of the alternative context neighborhoods is used to avoid relying on significant-coefficient flags in other coefficient groups except for the flags immediately adjacent the right border and bottom border of the coefficient group, and the flag diagonally to the lower-right.

16 Claims, 14 Drawing Sheets

(56) References Cited

OTHER PUBLICATIONS

B. Bross, W-J Han, J-R Ohm, G. J. Sullivan, and T. Wiegand, "WD4: Working Draft 4 of High-Efficiency Video Coding," JCT-VC of ITU-T SG16 WP3 and ISO/IEC JTC/SC29/WG11, 6th Meeting, Torino, Jul. 2011.

F. Bossen, "Common test conditions and software reference configurations", JCTVC-F900, JCT-VC of ITU-T SG16 WP3 and ISO/IEC JTC1/SC29/WG11, 6th Meeting, Torino, Jul. 2011.

T. Nguyen, T. Winken, D. Marpe et al., "Reduced-complexity entropy coding of transform coefficient levels using a combination of VLC and PIPE", JCTVC-D336, JCT-VC of ITU-T SG16 WP3 and ISO/IEC JTC1/SC29/WG11, 4th Meeting, Daegu, Jan. 2011.

J. Sole, R. Joshi, M. Karczewicz, "Non-CE11: Diagonal sub-block scan for HE residual coding", JCT-VC of ITU-T SG16 WP3 and ISO/IEC JTC1/SC29/WG11, 7th Meeting, Geneva, Nov. 2011.

B. Bross, W-J Han, J-R Ohm, G. J. Sullivan, and T. Wiegand, "WD5: Working Draft 4 of High-Efficiency Video Coding," JCTVC-G1103_d4, JCT-VC of ITU-T SG16 WP3 and ISO/IEC JTC1/SC29/WG11, 7th Meeting, Geneva, Nov. 2011.

N. Nguyen, T. Ji, D. He, G. Martin-Cocher and L. Song, "Multiple Level Significance Maps for Large Transform Units", JCT-VC of ITU-T SG16 WP3 and ISO/IEC JTC1/SC29/WG11, 7th Meeting, Geneva, Nov. 2011.

Marpe et al., Context-Based Adaptive Binary Arithmetic Coding in JVT/H.26L, 2002 International Conference on Image Processing, vol. 2, pp. II-513, II-516, 2002.

PCT International Search Report and Written Opinion relating to application No. PCT/CA2012/050051 dated Oct. 17, 2012.

Bross et al.: "High Efficiency Video Coding (HEVC) text specification Working Draft 5" dated Dec. 19, 2011, XP030111032.

Nguyen et al.: "Multi-level Significant Maps for Large Transform Units" dated Nov. 9, 2011, XP030110628.

Kang et al.: "Parallelizable context for significance coding of large transform blocks" dated Nov. 8, 2011, XP030110570.

EPO, Extended European Search Report relating to Application No. 13165646.4 dated Jan. 13, 2014.

Extended European Search Report relating to application No. 12151980.5 dated Apr. 12, 2012.

Bross B et al.: "High Efficiency Video Coding (HEVC) Text Specification Working Draft 5", 7. JCT-VC Meeting; 98. MPEG Meeting; Geneva; (Joint Collaborative Team on Video Coding of ISO/IEC JTC1/SC29/WG11 and ITU-T SG.16), No. JCTVC-G1103, Dec. 19, 2011.

Kang J et al.: "Parallelizable Context for Significance Coding of Large Transform Blocks", 7. JCT-VC Meeting; 98. MPEG Meeting; Geneva; (Joint Collaborative Team on Video Coding of ISO/IEC JTC1/SC29/WG11 and ITU-T SG.16), Nov. 8, 2011.

Lou J et al.: "On Context Selection for Significant Coeff_flag Coding", 5. JCT-VC Meeting; 96. MPEG Meeting; Geneva; (Joint Collaborative Team on Video Coding of ISO/IEC JTC1/SC29/WG11and ITU-T SG. 16), No. JCTVC-E362, Mar. 11, 2011.

* cited by examiner

| 15 | 13 | 10 | 6 |
|----|----|----|---|
| 14 | 11 | 7  | 3 |
| 12 | 8  | 4  | 1 |
| 9  | 5  | 2  | 0 |

METHODS AND DEVICES FOR CONTEXT MODELING TO ENABLE MODULAR PROCESSING

COPYRIGHT NOTICE

A portion of the disclosure of this document and accompanying materials contains material to which a claim for copyright is made. The copyright owner has no objection to the facsimile reproduction by anyone of the patent document or the patent disclosure, as it appears in the Patent and Trademark Office files or records, but reserves all other copyright rights whatsoever.

FIELD

The present application generally relates to data compression and, in particular, to methods and devices for context modeling when encoding and decoding residual video data.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The current state-of-the-art for video encoding is the ITU-T H.264/AVC video coding standard. It defines a number of different profiles for different applications, including the Main profile, Baseline profile and others. A next-generation video encoding standard is currently under development through a joint initiative of MPEG-ITU termed High Efficiency Video Coding (HEVC). The initiative may eventually result in a video-coding standard commonly referred to as MPEG-H.

There are a number of standards for encoding/decoding images and videos, including H.264, that use block-based coding processes. In these processes, the image or frame is divided into blocks, typically 4×4 or 8×8, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction). It is expected that MPEG-H will also have these features.

When spectrally transforming residual data, many of these standards prescribe the use of a discrete cosine transform (DCT) or some variant thereon. The resulting DCT coefficients are then quantized using a quantizer to produce quantized transform domain coefficients, or indices.

The block or matrix of quantized transform domain coefficients (sometimes referred to as a "transform unit") is then entropy encoded using a particular context model. In H.264/AVC and in the current development work for MPEG-H, the quantized transform coefficients are encoded by (a) encoding a last significant coefficient position indicating the location of the last non-zero coefficient in the transform unit, (b) encoding a significance map indicating the positions in the transform unit (other than the last significant coefficient position) that contain non-zero coefficients, (c) encoding the magnitudes of the non-zero coefficients, and (d) encoding the signs of the non-zero coefficients. This encoding of the quantized transform coefficients often occupies 30-80% of the encoded data in the bitstream.

BRIEF DESCRIPTION OF THE DRAWINGS

Reference will now be made, by way of example, to the accompanying drawings which show example embodiments of the present application, and in which:

FIGS. 12 through 20 show various example context neighborhood that may be used for significant-coefficients in certain positions within the block.

Similar reference numerals may have been used in different figures to denote similar components.

DESCRIPTION OF EXAMPLE EMBODIMENTS

Figure 1:
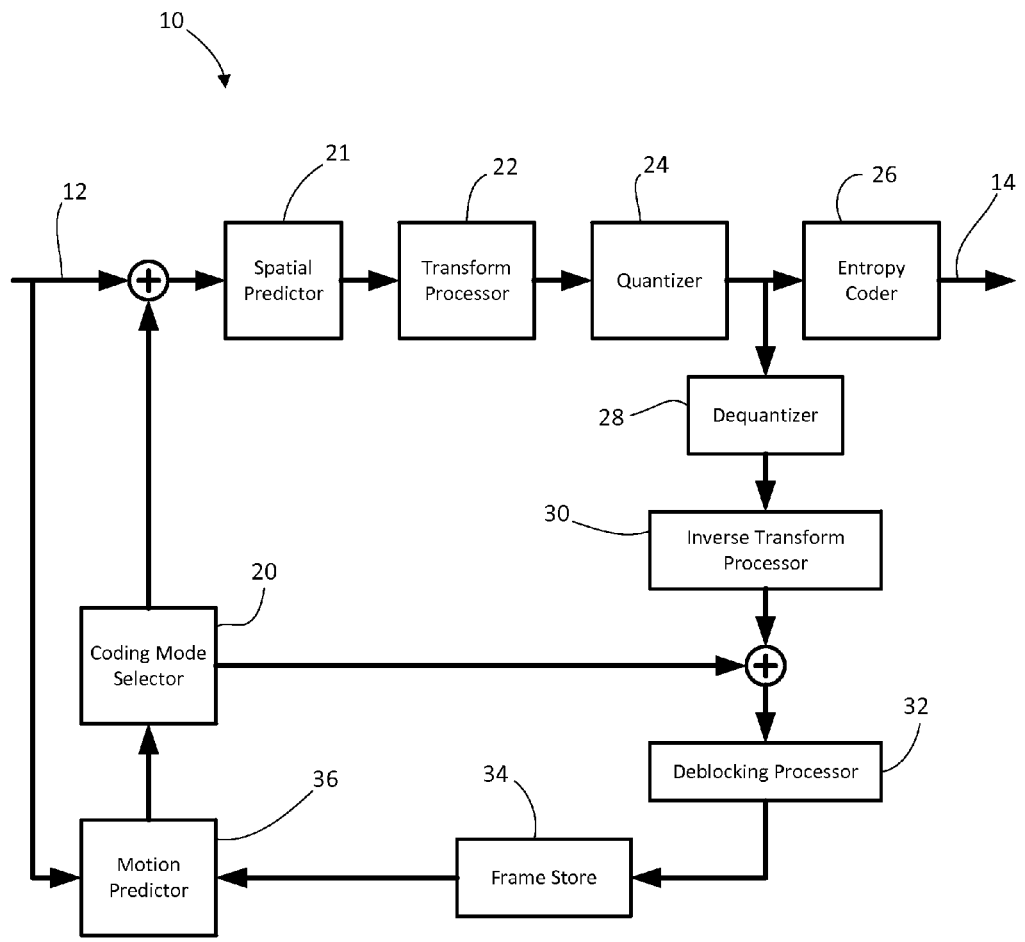
FIG. 1 shows, in block diagram form, an encoder for encoding video.

The present application describes methods and encoders/decoders for encoding and decoding residual video data using multi-level significance maps and coefficient level encoding. Context derivation methods are described for determining context when encoding and decoding significant-coefficient flags. Context derivation methods are also described for determining context when encoding and decoding coefficient level data.

In one aspect, the present application describes a method of decoding a bitstream of encoded video by reconstructing significant-coefficient flags for a transform unit, the transform unit being partitioned into a plurality of block-based coefficient groups. The method includes, for a significant-coefficient flag within a current coefficient group, determining whether that significant-coefficient flag is within a right column of the current coefficient group or a bottom row of the current coefficient group and, if so, then selecting a first set of nearby significant-coefficient flag positions relative to that significant-coefficient flag, and otherwise selecting a different, second set of nearby significant-coefficient flag positions relative to that significant-coefficient flag. The method also includes determining a context for that significant-coefficient flag from a sum of the selected significant-coefficient flags in the positions in the selected set; decoding that significant-coefficient flag using its determined context; and updating the determined context.

In another aspect, the present application describes a method of decoding a bitstream of encoded video by reconstructing significant-coefficients for a transform unit, the transform unit being partitioned into a plurality of block-based coefficient groups. The method includes, for a significant-coefficient flag within a current coefficient group, determining whether that significant-coefficient flag is within a right column of the current coefficient group or a bottom row of the current coefficient group and, if so, then selecting a first set of nearby significant-coefficient flags, and otherwise selecting a different, second set of nearby significant-coefficient flags; determining a context for that significant-coefficient flag from a sum of the selected significant-coefficient flags in the selected set; decoding that significant-coefficient flag using its determined context; and updating the determined context.

In further aspect, the present application describes a method of decoding a bitstream of encoded video by reconstructing significant-coefficients for a transform unit, the transform unit being portioned into a plurality of contiguous coefficient groups. The method includes, for each significant-coefficient flag within a coefficient group, determining a context for that significant-coefficient flag based on a sum of a plurality of nearby significant-coefficient flags, wherein the nearby significant-coefficient flags exclude any significant-coefficient flags outside the coefficient group except for significant-coefficient flags in the column immediately to the right of the coefficient group, significant-coefficient flags in the row immediately below the coefficient group, and a significant-coefficient flag diagonally adjacent the bottom-right corner of the coefficient group; decoding that significant-coefficient flag using its determined context; and updating the determined context.

In a further aspect, the present application describes encoders and decoders configured to implement such methods of encoding and decoding.

In yet a further aspect, the present application describes non-transitory computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the H.264 standard for video coding and/or the developing MPEG-H standard. Those ordinarily skilled in the art will understand that the present application is not limited to H.264/AVC or MPEG-H but may be applicable to other video coding/decoding standards, including possible future standards, multi-view coding standards, scalable video coding standards, and reconfigurable video coding standards.

In the description that follows, when referring to video or images the terms frame, picture, slice, tile and rectangular slice group may be used somewhat interchangeably. Those of skill in the art will appreciate that, in the case of the H.264 standard, a frame may contain one or more slices. It will also be appreciated that certain encoding/decoding operations are performed on a frame-by-frame basis, some are performed on a slice-by-slice basis, some picture-by-picture, some tile-by-tile, and some by rectangular slice group, depending on the particular requirements or terminology of the applicable image or video coding standard. In any particular embodiment, the applicable image or video coding standard may determine whether the operations described below are performed in connection with frames and/or slices and/or pictures and/or tiles and/or rectangular slice groups, as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to transform units, coding units, groups of coding units, etc., as will become apparent in light of the description below.

The present application describes example processes and devices for encoding and decoding sign bits for the non-zero coefficients of a transform unit. The non-zero coefficients are identified by a significance map. A significance map is a block, matrix, group, or set of flags that maps to, or corresponds to, a transform unit or a defined unit of coefficients (e.g. several transform units, a portion of a transform unit, or a coding unit). Each flag indicates whether the corresponding position in the transform unit or the specified unit contains a non-zero coefficient or not. In existing standards, these flags may be referred to as significant-coefficient flags. In existing standards, there is one flag per coefficient from the DC coefficient to the last significant coefficient in a scan order, and the flag is a bit that is zero if the corresponding coefficient is zero and is set to one if the corresponding coefficient is non-zero. The term "significance map" as used herein is intended to refer to a matrix or ordered set of significant-coefficient flags for a transform unit, as will be understood from the description below, or a defined unit of coefficients, which will be clear from the context of the applications.

It will be understood, in light of the following description, that the multi-level encoding and decoding structure might be applied in certain situations, and those situations may be determined from side information like video content type (natural video or graphics as identified in sequence, picture, or slice headers). For example, two levels may be used for natural video, and three levels may be used for graphics (which is typically much more sparse). Yet another possibility is to provide a flag in one of the sequence, picture, or slice headers to indicate whether the structure has one, two, or three levels, thereby allowing the encoder the flexibility of choosing the most appropriate structure for the present content. In another embodiment, the flag may represent a content type, which would be associated with the number of levels. For example, a content of type "graphic" may feature three levels.

Figure 2:
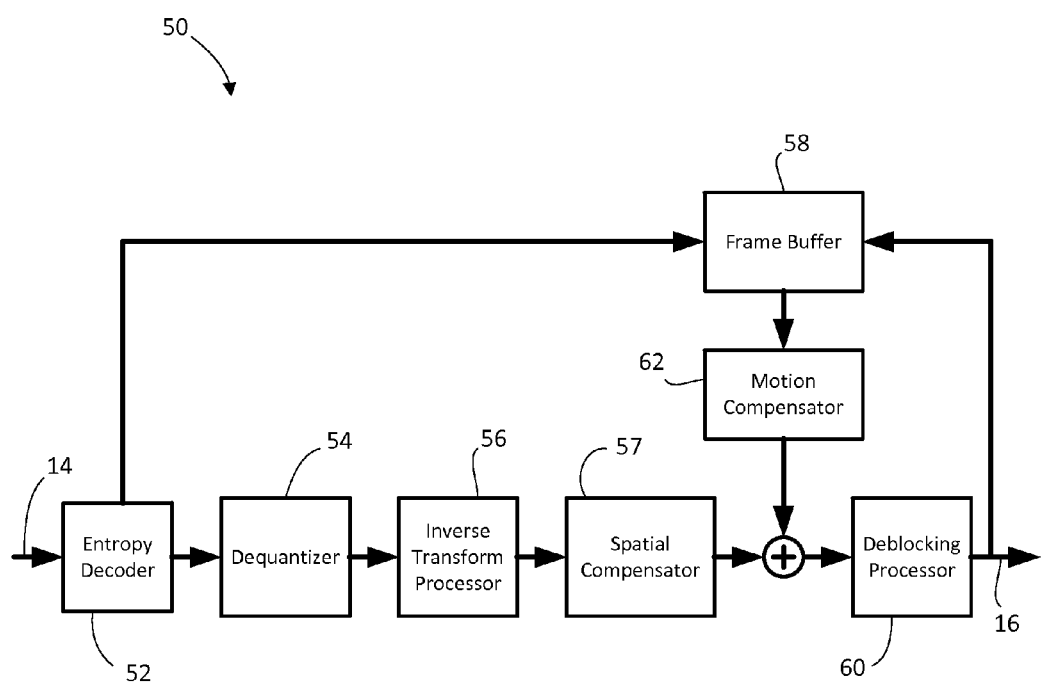
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard, like MPEG-H.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular coding units (e.g. macroblocks, coding units, etc.) within the frame/slice are inter or intra coded. The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform or others may be used in some instances. The block-based transform is performed on a coding unit, macroblock or sub-block basis, depending on the size of the macroblocks or coding units. In the H.264 standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes. In some cases, a 16×16 macroblock may include a non-overlapping combination of 4×4 and 8×8 transform blocks.

Applying the block-based transform to a block of pixel data results in a set of transform domain coefficients. A "set" in this context is an ordered set in which the coefficients have coefficient positions. In some instances the set of transform domain coefficients may be considered as a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

The block or matrix of quantized transform domain coefficients may be referred to herein as a "transform unit" (TU). In some cases, the TU may be non-square, e.g. a non-square quadrature transform (NSQT).

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction algorithm, the source data of the block may be converted to residual data. The transform processor 22 then encodes the residual data. H.264, for example, prescribes nine spatial prediction modes for 4×4 transform blocks. In some embodiments, each of the nine modes may be used to independently process a block, and then rate-distortion optimization is used to select the best mode.

The H.264 standard also prescribes the use of motion prediction/compensation to take advantage of temporal prediction. Accordingly, the encoder 10 has a feedback loop that includes a de-quantizer 28, inverse transform processor 30, and deblocking processor 32. The deblocking processor 32 may include a deblocking processor and a filtering processor. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. Accordingly, for macroblocks or coding units to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the reference block and the current block. Information regarding the reference frame and/or motion vector may not be processed by the transform processor 22 and/or quantizer 24, but instead may be supplied to the entropy encoder 26 for encoding as part of the bitstream along with the quantized coefficients.

Those ordinarily skilled in the art will appreciate the details and possible variations for implementing video encoders.

The decoder 50 includes an entropy decoder 52, dequantizer 54, inverse transform processor 56, spatial compensator 57, and deblocking processor 60. The deblocking processor 60 may include deblocking and filtering processors. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for use in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the "video data". It will be appreciated that, in some cases, such as with an intra-coded macroblock or coding unit, the recreated "video data" is the residual data for use in spatial compensation relative to a previously decoded block within the frame. The spatial compensator 57 generates the video data from the residual data and pixel data from a previously decoded block. In other cases, such as inter-coded macroblocks or coding units, the recreated "video data" from the inverse transform processor 56 is the residual data for use in motion compensation relative to a reference block from a different frame. Both spatial and motion compensation may be referred to herein as "prediction operations".

The motion compensator 62 locates a reference block within the frame buffer 58 specified for a particular inter-coded macroblock or coding unit. It does so based on the reference frame information and motion vector specified for the inter-coded macroblock or coding unit. It then supplies the reference block pixel data for combination with the residual data to arrive at the reconstructed video data for that coding unit/macroblock.

A deblocking/filtering process may then be applied to a reconstructed frame/slice, as indicated by the deblocking processor 60. After deblocking/filtering, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

It is expected that MPEG-H-compliant encoders and decoders will have many of these same or similar features.

Quantized Transform Domain Coefficient Encoding and Decoding

As noted above, the entropy coding of a block or set of quantized transform domain coefficients includes encoding the significance map (e.g. a set of significant-coefficient flags) for that block or set of quantized transform domain coefficients. The significance map is a binary mapping of the block indicating in which positions (from the DC position to the last significant-coefficient position) non-zero coefficients appear. The significance map may be converted to a vector in accordance with the scan order (which may be vertical, horizontal, diagonal, zig zag, or any other scan order). The scan is typically done in "reverse" order, i.e. starting with the last significant coefficient and working back through the significant map in reverse direction until the significant-coefficient flag in the upper-left corner at [0,0] is reached. In the present description, the term "scan order" is intended to mean the order in which flags, coefficients, or groups, as the case may be, are processed and may include orders that are referred to colloquially as "reverse scan order".

Each significant-coefficient flag is then entropy encoded using the applicable context-adaptive coding scheme. For example, in many applications a context-adaptive binary arithmetic coding (CABAC) scheme may be used.

With 16×16 and 32×32 significance maps, the context for a significant-coefficient flag is (in most cases) based upon neighboring significant-coefficient flag values. Among the contexts used for 16×16 and 32×32 significance maps, there are certain contexts dedicated to the bit position at [0,0] and (in some example implementations) to neighboring bit positions, but most of the significant-coefficient flags take one of four or five contexts that depend on the cumulative values of neighboring significant-coefficient flags. In these instances, the determination of the correct context for a significant-coefficient flag depends on determining and summing the values of the significant-coefficient flags at neighboring locations (typically five locations, but it could be more or fewer in some instances).

The significant-coefficient levels for those non-zero coefficients may then be encoded. In one example implementation, the levels may be encoded by first encoding a map of those non-zero coefficients having an absolute value level greater than one. Another map may then be encoded of those non-zero coefficients having a level greater than two. The value or level of any of the coefficients having an absolute value greater than two is then encoded. In some cases, the value encoded may be the actual value minus three. The sign of each of the non-zero coefficients is also encoded. Each non-zero coefficient has a sign bit indicating whether the level of that non-zero coefficient is negative or positive, although sign bit hiding can be employed in some instances to reduce the number of sign bits.

Figure 3:
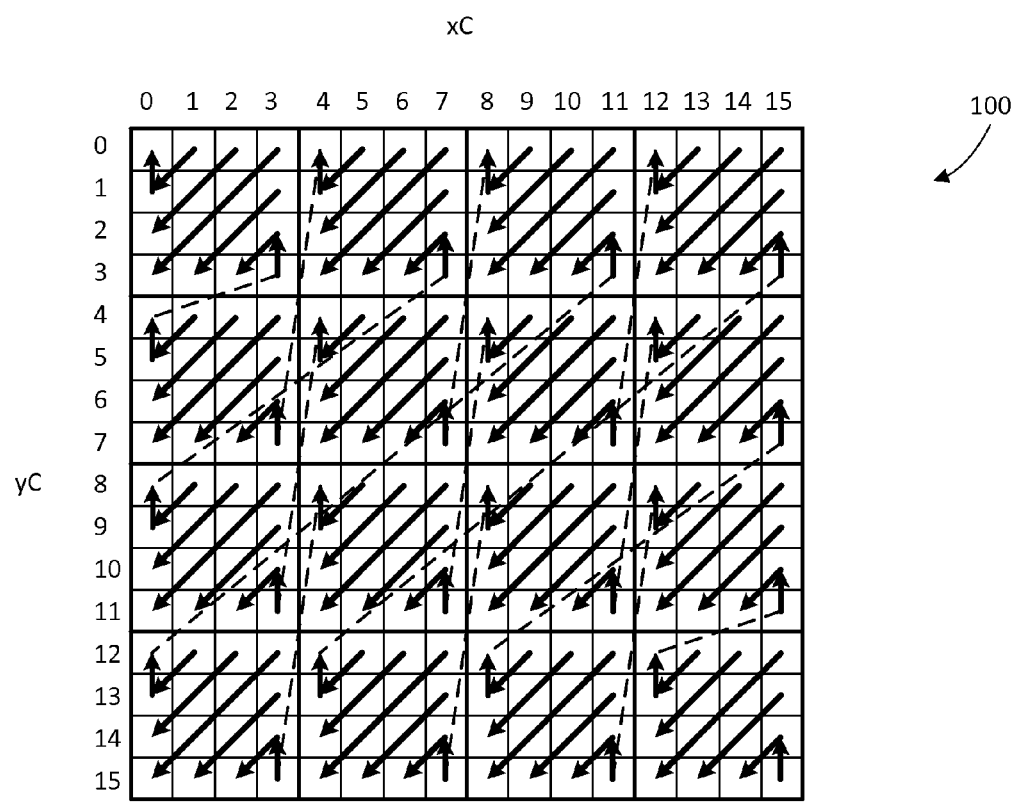
FIG. 3 shows, an example of a multi-level scan order for a 16×16 transform unit.

Some prior work has focused on using multi-level significance maps. Reference is now made to FIG. 3, which shows a 16×16 transform unit 100 with a multi-level diagonal scan order illustrated. The transform unit 100 is partitioned into sixteen contiguous 4×4 coefficient groups or "sets of significant-coefficient flags". Within each coefficient group, a diagonal scan order is applied within the group, rather than across the whole transform unit 100. The sets or coefficient groups themselves are processed in a scan order, which in this example implementation is also a diagonal scan order. It will be noted that the scan order in this example is illustrated in "reverse" scan order; that is, the scan order is shown progressing from the bottom-right coefficient group in a downward-left diagonal direction towards the upper-left coefficient group. In some implementations the same scan order may be defined in the other direction; that is, progressing in am upwards-right diagonal direction and when applied during encoding or decoding may be applied in a "reverse" scan order.

The use of multi-level significance maps involves the encoding of an L1 or higher-level significance map that indicates which coefficient groups may be expected to contain non-zero significant-coefficient flags, and which coefficient groups contain all zero significant-coefficient flags. The coefficient groups that may be expected to contain non-zero significant-coefficient flags have their significant-coefficient flags encoded, whereas the coefficient groups that contain all zero significant-coefficient flags are not encoded (unless they are groups that are encoded because of a special case exception because they are presumed to contain at least one non-zero significant-coefficient flag). Each coefficient group has a significant-coefficient-group flag (unless a special case applies in which that coefficient group has a flag of a presumed value, such as the group containing the last significant coefficient, the upper left group, etc.).

The use of multi-level significance maps facilitates the modular processing of residual data for encoding and decoding.

Context Determination for Significance Map Encoding and Decoding

As noted above, for 16×16 and 32×32 TUs, (as well as for other larger TU sizes) a context model that may be used for encoding and decoding a significant-coefficient flag in position x is based on the significant-coefficient flags of nearby positions. In one example, the context model bases the context for the significant-coefficient flag in position x on the sum of significant-coefficient flags in positions a, b, c, d, and e. An example of such a context neighborhood is diagrammatically shown in FIG. 8.

To the extent that the significant-coefficient flags a, b, c, d, or e fall outside the borders of the TU they are assumed to be zero. The context definition shown in FIG. 8 assumes that x is not in the DC position [0, 0] within the transform unit, since a distinct context is used for encoding flags in that position.

Figures 8, 9:
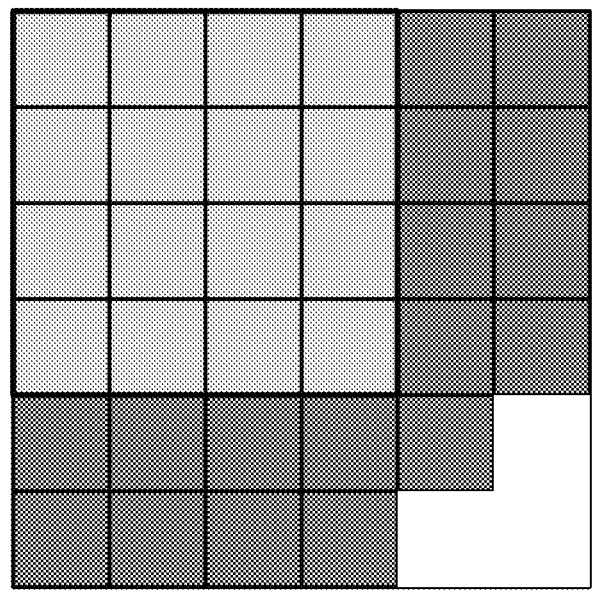
FIG. 8 diagrammatically illustrates an example context neighborhood for determining context of a significant-coefficient flag based upon neighboring significant-coefficient flags.
FIG. 9 illustrates reliance upon significant-coefficient flags of adjacent coefficient groups.

In the case of a multi-level significance map, it will be noted that for all but four of the positions significance-coefficient flags from outside the 4×4 coefficient group are factored into the determination of context. In fact, for positions along the rightmost column at least three significant-coefficient flags from the right neighbor coefficient group are used, and for positions along the bottom row at least three significant-coefficient flags from the bottom neighbor coefficient group are used. In the most extreme case, for the bottom-right position of the coefficient group, the context determination is entirely based on significant-coefficients from outside the current coefficient group; in fact, two from the right neighbor, two from the bottom neighbor, and one from the lower-right diagonal neighbor. Accordingly, to process a coefficient group of sixteen significant-coefficient flags, seventeen significant-coefficient flags from three neighboring coefficient groups are needed. FIG. 9 illustrates the 4×4 coefficient group and the neighboring significant-coefficient flags used in context determination.

In FIG. 9, the light grey 4×4 coefficient group contains the sixteen significant-coefficient flags being processed, i.e. for which context must be determined. The darker grey indicates the seventeen positions from the neighboring coefficient groups that must be accessed in order to determine context for the sixteen significant-coefficient flags within the coefficient group. This amounts to an overhead of 17/16>1. To avoid complexities with the irregular shape, in many implementations this would be processed as a 6×6 block of data, making the overhead 20/16. This makes the design less modular and memory efficient than is desirable.

Figures 10, 11:
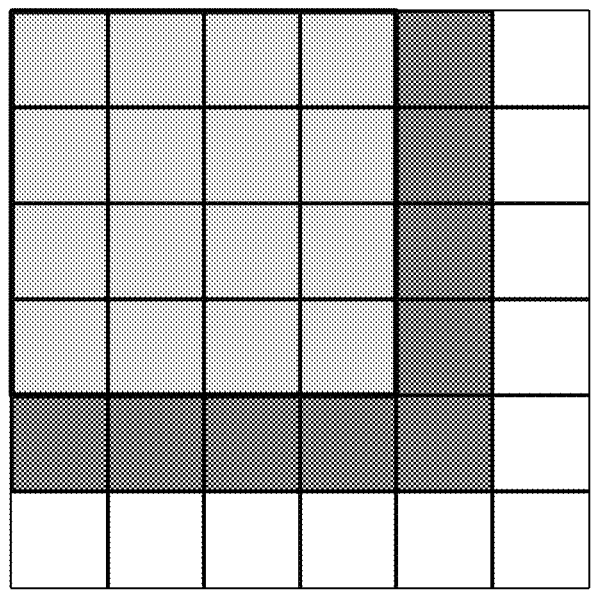
FIG. 10 illustrates a reduced reliance upon significant-coefficient flags of adjacent coefficient groups.
FIG. 11 illustrates a positional indexing convention for a 4×4 block.

In order to reduce the overhead required, the present application proposes a context model in which the context neighborhood (that is, the nearby significant-coefficient flags that are used to determine context) is modified to avoid using any significant-coefficient flags from outside the coefficient group except for the nearby significant-coefficient flags in the column to the right of the coefficient group, the nearby significant-coefficient flags in the row below the coefficient group, and the nearby significant-coefficient flag diagonally adjacent the bottom-right corner of the coefficient group. As a result, the overhead is reduced to 9/16, as diagrammatically illustrated in FIG. 10.

In order to implement this more compact context model, the context neighborhood changes depending on which significant-coefficient position within the coefficient group is under evaluation. In particular, when the significant-coefficient position for which context is to be determined is in the right column or in the bottom row of the coefficient group, then a modified context neighborhood is used; otherwise, the conventional context neighborhood is used. That is, if xC % 4=3 or if yC % 4=3, then one of the modified context neighborhoods is used for context determination.

The modified context neighborhoods or templates are defined sets of nearby significant coefficient flag positions relative to the significant-coefficient flag under consideration. That is, the defined context neighborhoods specify the locations or positions of the significant-coefficient flags to be used in context determination in terms of their relative position to the significant-coefficient flag for which context is being determined. Specific example context neighborhoods (sets of nearby significant-coefficient flag positions) that may be used in one embodiment are as follows, where the indexing of significant-coefficient flag positions is based upon the indexing convention shown in FIG. 11.

Figure 12:
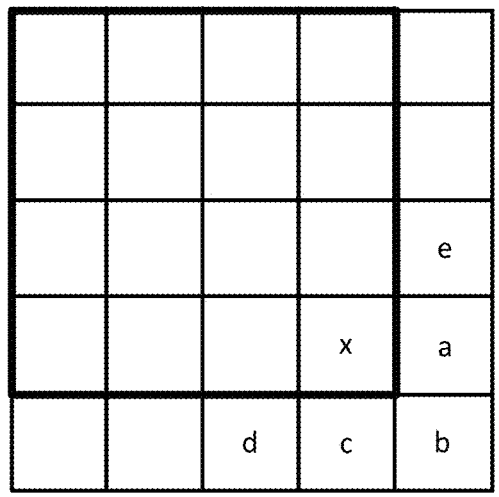

For position 0, the context neighborhood is defined as shown in FIG. 12.

Figure 13:
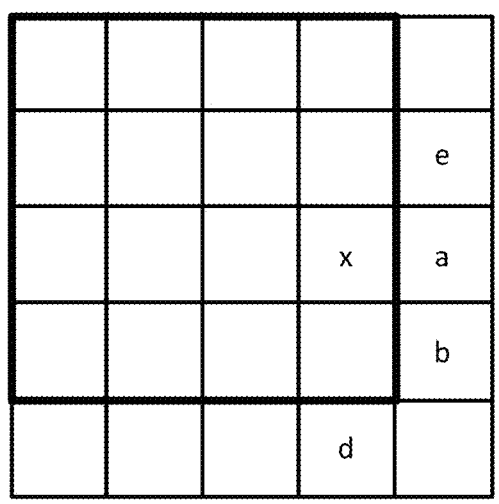

For position 1, the context neighborhood is defined as shown in FIG. 13.

Note that this context neighborhood only features four neighbors. It does not include the significant-coefficient flag in position 0 within the coefficient group. This is to permit some parallelization of the processing of flags within the BAC engine. The context determination, decoding, and context update relating to position 0 may not be complete at the time that the decoder (or encoder) seeks to determine context for position 1. Accordingly, the model attempts to avoid using position 0 when evaluating context for position 1, in this embodiment.

Figures 14, 15:
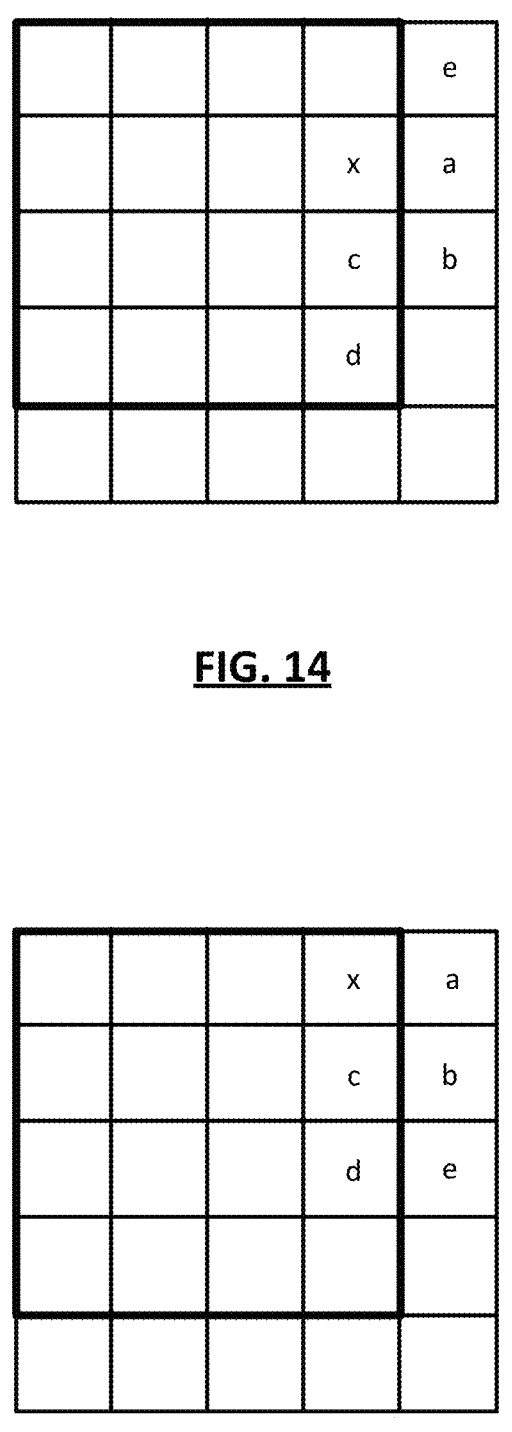

For position 3, the neighborhood is diagrammatically illustrated in FIG. 14.

For position 6, the neighborhood is defined in the context model shown in FIG. 15.

Figures 16, 17:
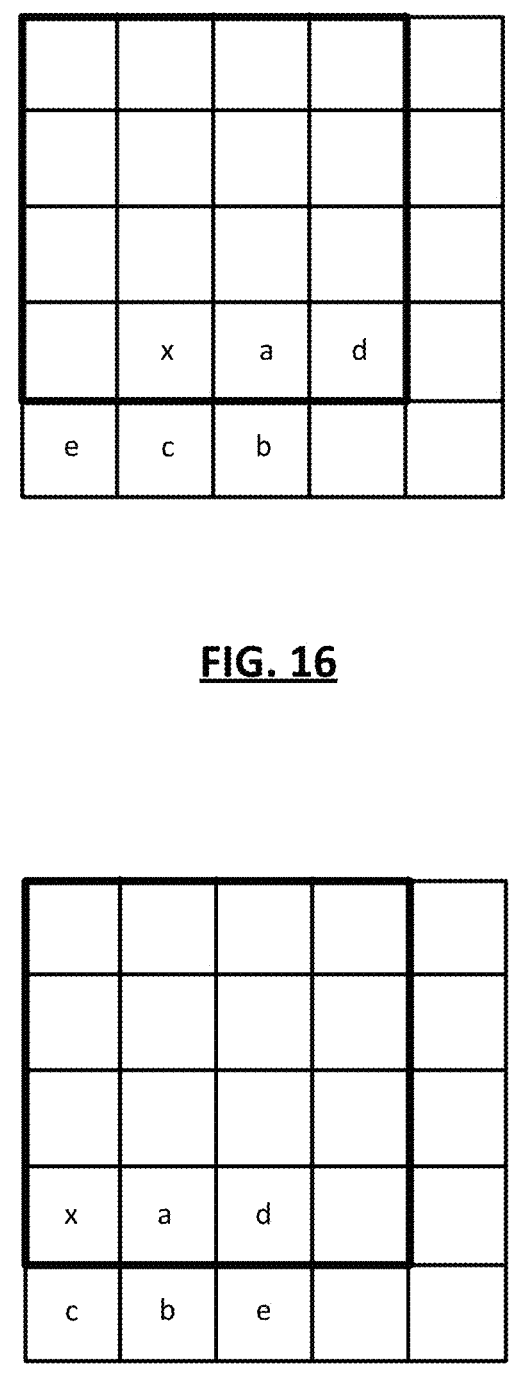

For positions 2 and 5 in a coefficient group, the neighborhood is defined as shown in FIG. 16.

For position 9, the neighborhood is illustrated in FIG. 17.

For all other positions in the coefficient group, the neighborhood is the neighborhood defined in FIG. 8.

These example neighborhoods satisfy the condition that no context of a significant coefficient flag relies upon a significant-coefficient flag processed immediately prior to it in the scan order.

Figures 18, 19:
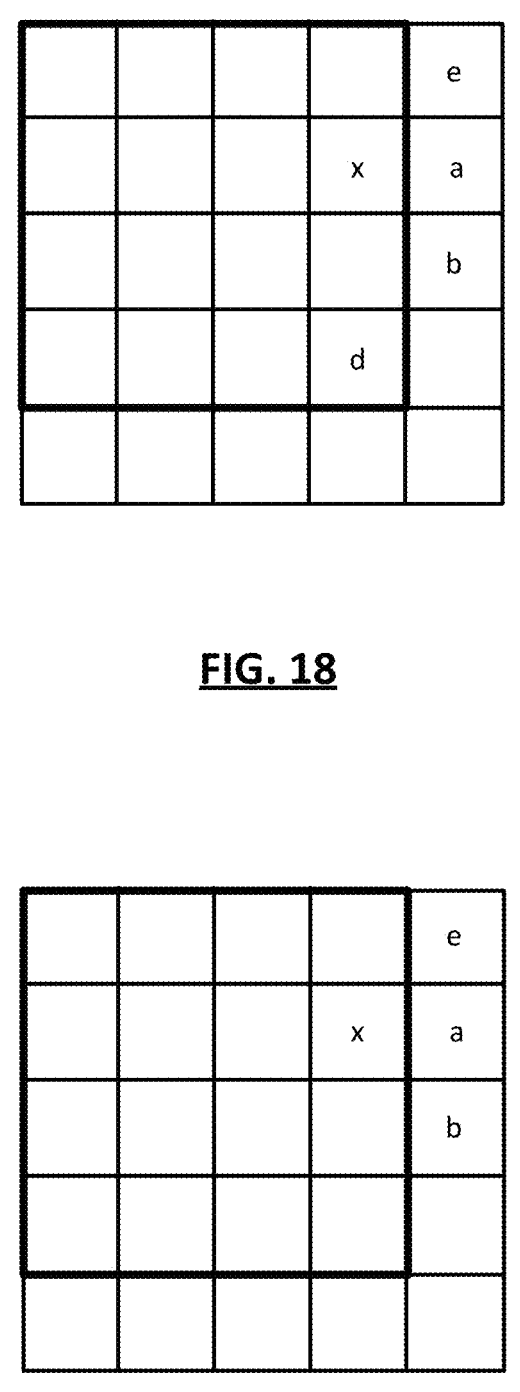

As noted above, in some embodiments, to permit parallelization in context derivation, not all positions in the neighborhoods described above may be used in context derivation. For example, for position 3, a context neighborhood such as the example neighborhoods shown in FIGS. 18 and 19 may be used.

Figure 20:
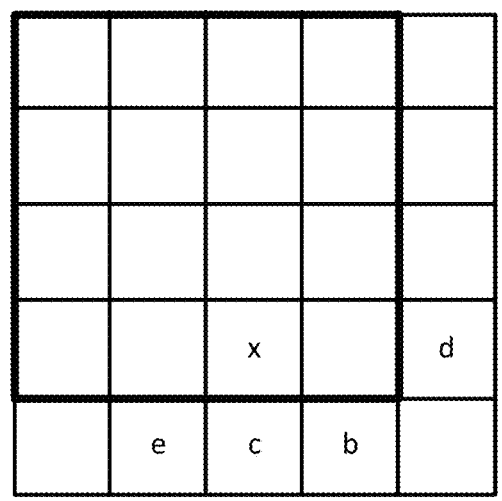

Similarly, for position 2, the neighborhood illustrated in FIG. 20 may be used.

In another embodiment, the contexts above are modified such that nearby significant-coefficient flag 'e' is not used for context derivation for significant-coefficient flags in positions 1, 3, 6, 2, 5 and 9. That is, for these context neighborhoods, the nearby significant-coefficient in position 'e' is assumed to be zero.

In yet another embodiment, the context determination further depends on the significant-coefficient-group flags of nearby coefficient groups. For example, the context determination may be partly based upon the significant-coefficient-group flags of the coefficient group to the right, the coefficient group below, and/or the coefficient group diagonally to the lower-right. The same context neighborhood definitions given above, or variations of them, may be used to determine context, but more there may be two context sets. The significant-coefficient-group flags of nearby coefficient groups may be used to determine whether the original context set is used or whether a new context set is used. Within that original or new context set the applicable context neighborhood determines which context is selected. In this example, the context determination is based on the following:

For a significant-coefficient flag in position 0, 4, 7, 8, or 10-15, use the original context set for context determination.

For a significant-coefficient flag in position 1, 3, or 6, use the newly-defined context set if the significant-coefficient-group flag of the right-neighbor coefficient group is 1; otherwise, use the original context set.

For a significant-coefficient flag in position 2, 5, or 9, use the newly-defined context set if the significant-coefficient group flag of the bottom-neighbor coefficient group is 1; otherwise, use the original context set.

Other variations of the foregoing context neighborhoods or embodiments will be appreciated by those ordinarily skilled in the art in light of the description herein.

Figure 4:
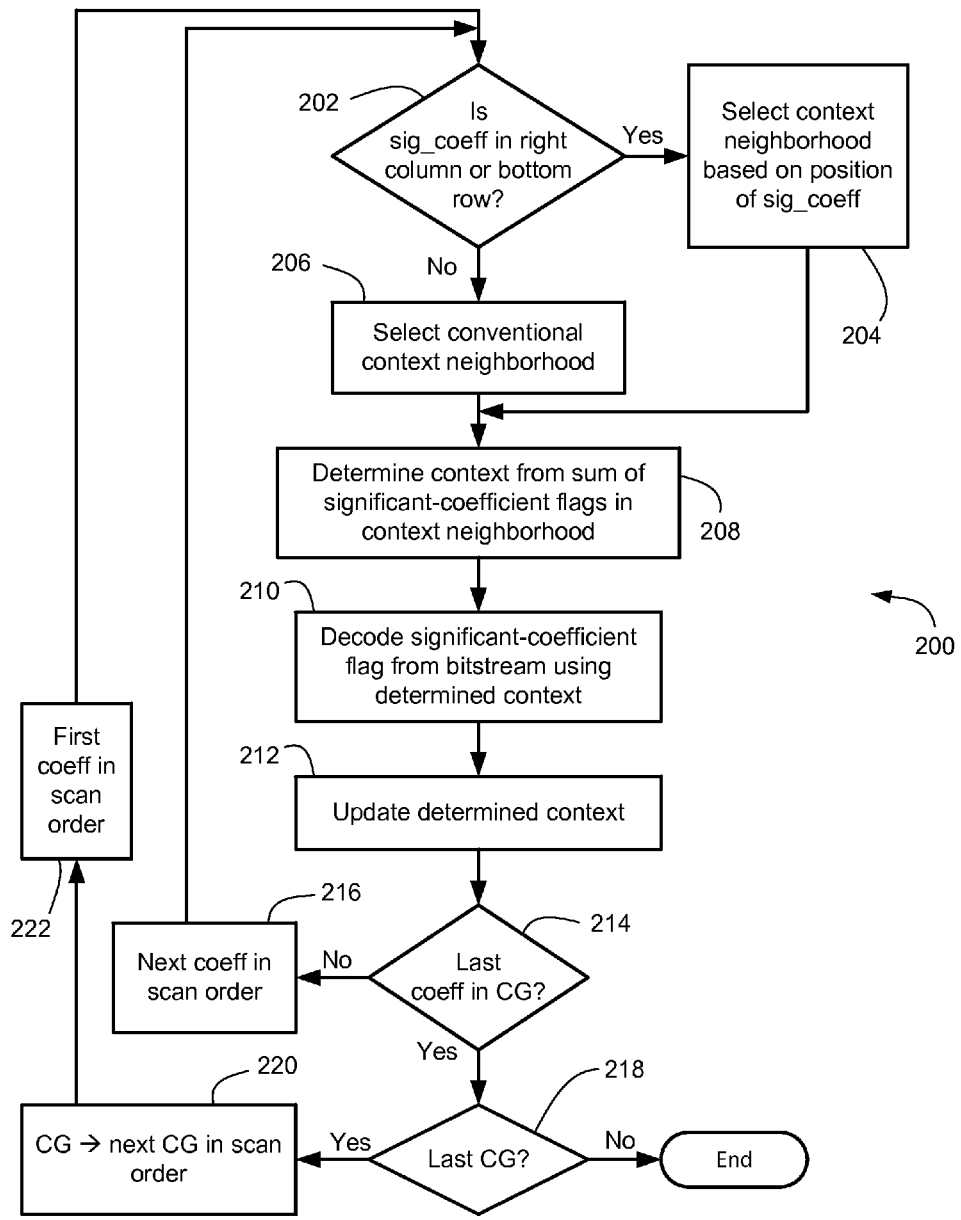
FIG. 4 shows an example method, in flowchart form, for decoding significant-coefficient flags.

Reference is now made to FIG. 4, which shows, in flowchart form, one example method 200 for decoding significant-coefficient flags for a transform unit in a video decoder.

The method 200 is a method for decoding significant-coefficient flags from a bitstream of encoded data as part of a video decoding process. The method 200 does not illustrate the decoding of the last significant coefficient position within a transform unit, or the decoding of coefficient levels, sign bits, or side information.

In operation 202, for a current significant-coefficient position, the decoder determines whether that significant-coefficient position is in the right column or bottom row of the coefficient group. If so, then in operation 204, the decoder selects a context neighborhood based on the position of that significant-coefficient within the coefficient group. Example context neighborhoods past on coefficient position are set out above, although other context neighborhoods may be applied in other implementations.

If the significant-coefficient position is not in the right column or bottom row, then in operation 206 the decoder selects the conventional context neighborhood. The conventional context neighborhood is the defined neighborhood of nearby significant-coefficients applicable to any of the nine positions that satisfy this criteria. It is the mapping:

$$\begin{array}{ccc} x & a & d \\ c & b & \\ e & & \end{array}$$

Once the context neighborhood is selected the decoder then determines the context for this significant-coefficient position based on a sum of significant-coefficient flags from the context neighborhood in operation 208. It will be appreciated that operations 202, 204, 206 and 208 may be implemented and integrated in many different ways. In one implementation, a variety of positional tests or logic rules are evaluated and corresponding nearby significant-coefficient flags added to the sum conditional on the test or rule, as will be illustrated by example syntax below.

Once the context is determined in operation 208, then in operation 210, the decoder decodes the significant-coefficient flag from the bitstream of encoded data using the determined context. The decoding may include binary arithmetic decoding.

In operation 212, the decoder updates the determined context based on the decoded value of the significant-coefficient flag.

In operation 214 the decoder determines whether this is the last of the significant-coefficient flags in the coefficient group, i.e. coefficient position 15. If not, then in operation 216 the decoder moves to the next significant-coefficient position in the diagonal scan order (reverse) within the coefficient group and returns to operation 202 to decode the next significant-coefficient flag.

If it is the last significant-coefficient flag in the coefficient group, then the decoder evaluates whether this is the last coefficient group in the transform unit 218. If so, then the method 200 exits; and, if not, then in operation 220 the decoder moves to the next coefficient group in the group-level scan order. In operation 222, the decoder resets to the first position in the scan order within the next coefficient group, i.e. to position 0, and then returns to operation 202 to decode that significant-coefficient flag in position 0 of the new coefficient group.

It will be appreciated that, for ease of illustration, operations 214 and 218 do not reflect the special handling for context determination that may occur in the case of the DC value at [0, 0] and, in some embodiments, at other positions in the transform unit.

An example syntax for implementing the position-dependent significant-coefficient context model is provided below. This example syntax is but one possible implementation. In this example, the context determination for the DC case (xC=0 and yC=0) is not shown.

This process is for derivation of the variable sigCtx using previously decoded bins of the syntax element significant_coeff_flag, which is the significant-coefficient flag. The variable sigCtx is initialized as 0.

The variable bottomRow is set to true if yC % 4 is equal to 3 (or equivalently, yC & 3 is equal to 3) and false otherwise. The variable rightCol is set to true if xC % 4 is equal to 3 (or equivalently, xC & 3 is equal to 3) and false otherwise.

When xC is less than (1<<log 2TrafoWidth)−1, the following applies:
sigCtx=sigCtx+significant_coeff_flag[xC+1][yC]
When xC is less than (1<<log 2TrafoWidth)−1, and yC is less than (1<<log 2TrafoHeight)−1, the following applies:
sigCtx=sigCtx+significant_coeff_flag[xC+1][yC+1]
When xC is less than (1<<log 2TrafoHeight)−2 and rightCol is false, the following applies:
sigCtx=sigCtx+significant_coeff_flag[xC+2][yC]
When all of the following conditions are true,
yC is less than (1<<log 2TrafoHeight)−1,
xC % 4 is not equal to 0 or yC % 4 is not equal to 0,
xC % 4 is not equal to 3 or yC % 4 is not equal to 2,
then the following applies:
sigCtx=sigCtx+significant_coeff_flag[xC][yC+1]
When yC is less than (1<<log 2TrafoHeight)−2, and sigCtx is less than 4, and bottomRow is false, the following applies:
sigCtx=sigCtx+significant_coeff_flag[xC][yC+2]
When rightCol is true, yC % 4>0, xC is less than (1<<log 2TrafoSize)−1, and sigCtx is less than 4, the following applies:
sigCtx=sigCtx+significant_coeff_flag[xC+1][yC−1]
When rightCol is true, yC % 4=0, xC is less than (1<<log 2TrafoSize)−1, and sigCtx is less than 4, the following applies:
sigCtx=sigCtx+significant_coeff_flag[xC+1][yC+2]
When bottomRow is true, xC % 4>0, yC is less than (1<<log 2TrafoSize)−1, and sigCtx is less than 4, the following applies:
sigCtx=sigCtx+significant_coeff_flag[xC−1][yC+1]
When bottomRow is true, xC % 4=0, yC is less than (1<<log 2TrafoSize)−1, and sigCtx is less than 4, the following applies:
sigCtx=sigCtx+significant_coeff_flag[xC+2][yC+1]
In this example implementation, the variable sigCtx is then modified in accordance with the following conditions and rules.

If color component index cIdx is equal to 0 and xC+yC are greater than (1<<(max(log 2TrafoWidth, log 2TrafoHeight)−2))−1, the following applies:
sigCtx=((sigCtx+1)>>1)+24
Otherwise, the following applies:
sigCtx=((sigCtx+1)>>1)+((cIdx>0)?18:21)
The context index increment ctxIdxInc is then derived using the color component index cIdx and sigCtx.

It will be understood that the foregoing is but one example implementation. Moreover, it will be understood that the example index offsets to the full set of contexts, such as '24' or '18', etc., are non-limiting examples.

Context Determination for Coefficient Level Encoding and Decoding

In some video encoding or decoding processes, the coefficient level coding and decoding is done in stages. That is, the coefficient coding process includes encoding a significance map that identifies all non-zero coefficients. The sign bits for the coefficients are also encoded. The level coding is then done by identifying which of the non-zero coefficients have a level greater than one. Of those coefficients that are greater than one, the coefficients that have a level greater than two are then identified. Of those coefficients, those that have a level greater than three then have their actual level encoded/decoded. With the latter set of coefficients, rather than encoding the absolute level, the level less three may be encoded (since it is known that the level is greater than two), and the decoder adds three to these decoded levels.

Context level coding and decoding is typically done in sets or groups of 16 coefficients. This corresponds well with the block-based coefficient group encoding and decoding of the significance map, and the multi-level scan order used in that process.

Like the encoding of the significance map, the encoding of the coefficient levels (greater-than-one, greater-than-two, and absolute-value-less-three), relies upon context modeling. In some implementations, the context set used for encoding coefficient levels in a set of 16 levels, e.g. a coefficient group, is dependent upon the previous set of coefficient levels processed, e.g. the previous coefficient group in scan order. The magnitudes of the coefficients in the previously processed scan set are used to determine which context set to use on the basis that the magnitudes of the coefficients in the previous set are correlated to the expected magnitudes of the coefficients in the current set.

Figure 21:
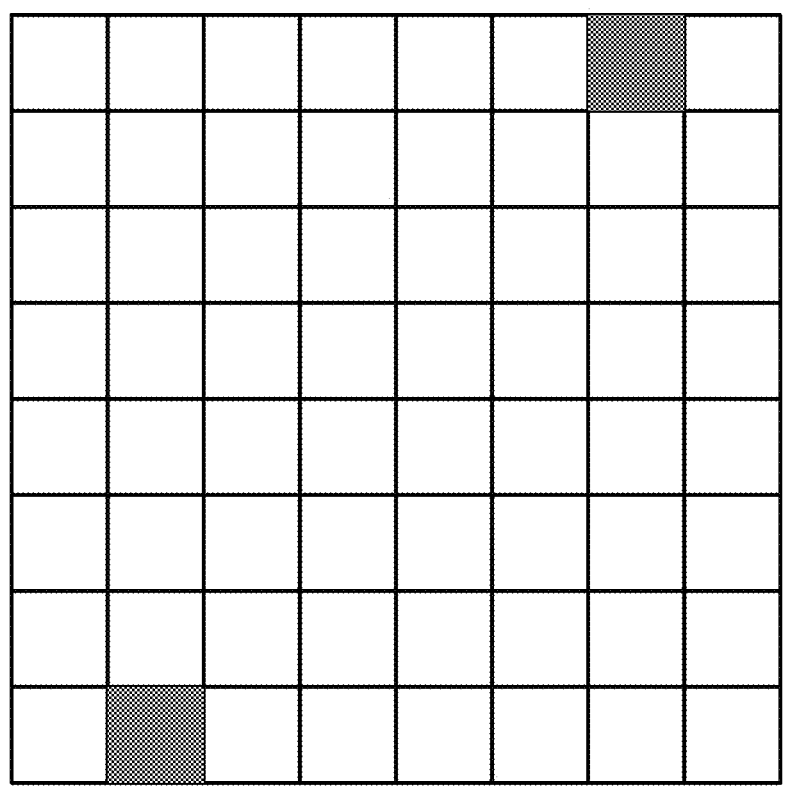
FIG. 21 shows an example 32×32 block divided into 4×4 coefficient groups.

When multi-level scan orders are used, such as is illustrated in FIG. 3, it is possible for situations to arise in which the previous coefficient group in scan order is not a nearby scan set. For example, the previous coefficient group in the (reverse) scan order may be located at the other side of the transform unit. An example 32×32 transform unit divided into 4×4 coefficient groups is shown in FIG. 21. The shaded coefficient groups are adjacent each other in the diagonal scan order. It will be appreciated that the magnitude of the coefficients in one of those coefficient groups is not necessarily well correlated with the magnitude of the coefficients in the other of those coefficient groups.

Accordingly, the present application proposes a new process for context determination for coefficient level coding. In proposal, the context selection for encoding coefficient levels of a coefficient group is based the right and lower neighboring coefficient groups. In particular, it may be based on the number of, or cumulative magnitude of, the non-zero coefficients in those neighboring coefficient groups.

The context selection may be based upon a function f( ) of the number of coefficients with absolute value greater than one. For example, the context index may be initialized to a particular value or index and then incremented by 1 if f( )>1 and incremented by 2 if f( )>3.

The symbols R and L are used below to indicate the number of coefficients with absolute value greater than 1 in the right neighbor coefficient group and the lower neighbor coefficient group, respectively. If either of the right or lower coefficient groups fall outside the boundaries of the transform unit, then R or L (as the case may be) is assumed to be 0.

In one embodiment, the function may be expressed as:

$$f(R,L)=\max(R,L)$$

In another embodiment, the function is a linear function, such as:

$$f(R,L)=aR+bL$$

where a and b are weighting coefficients and may be fixed or dynamic. For example, in one case a=b=½, which amounts to averaging R and L.

In yet another embodiment, the function is a minimum, such as:

$$f(R,L)=\min(R,L)$$

In yet a further embodiment, the function f( ) may be expressed as:

$$f(R,L)=Q(R)+Q(L)$$

where Q(k)=0 if k=0
Q(k)=1 if 0<k≤3, and
Q(k)=2 otherwise

In yet other embodiments, the lower-right diagonal coefficient group may alternatively or additionally be considered in determining context.

In all these embodiments, the determination of context is modular because the context determination does not require re-accessing a set of coefficients from across various previously-processed coefficient groups, but instead relies upon a value that is determined when processing a previous coefficient group as a group. Moreover, the above-described embodiments rely upon coefficient data from coefficient groups that are necessarily adjacent to the current coefficient group and, thus, more likely to be correlated.

Figure 5:
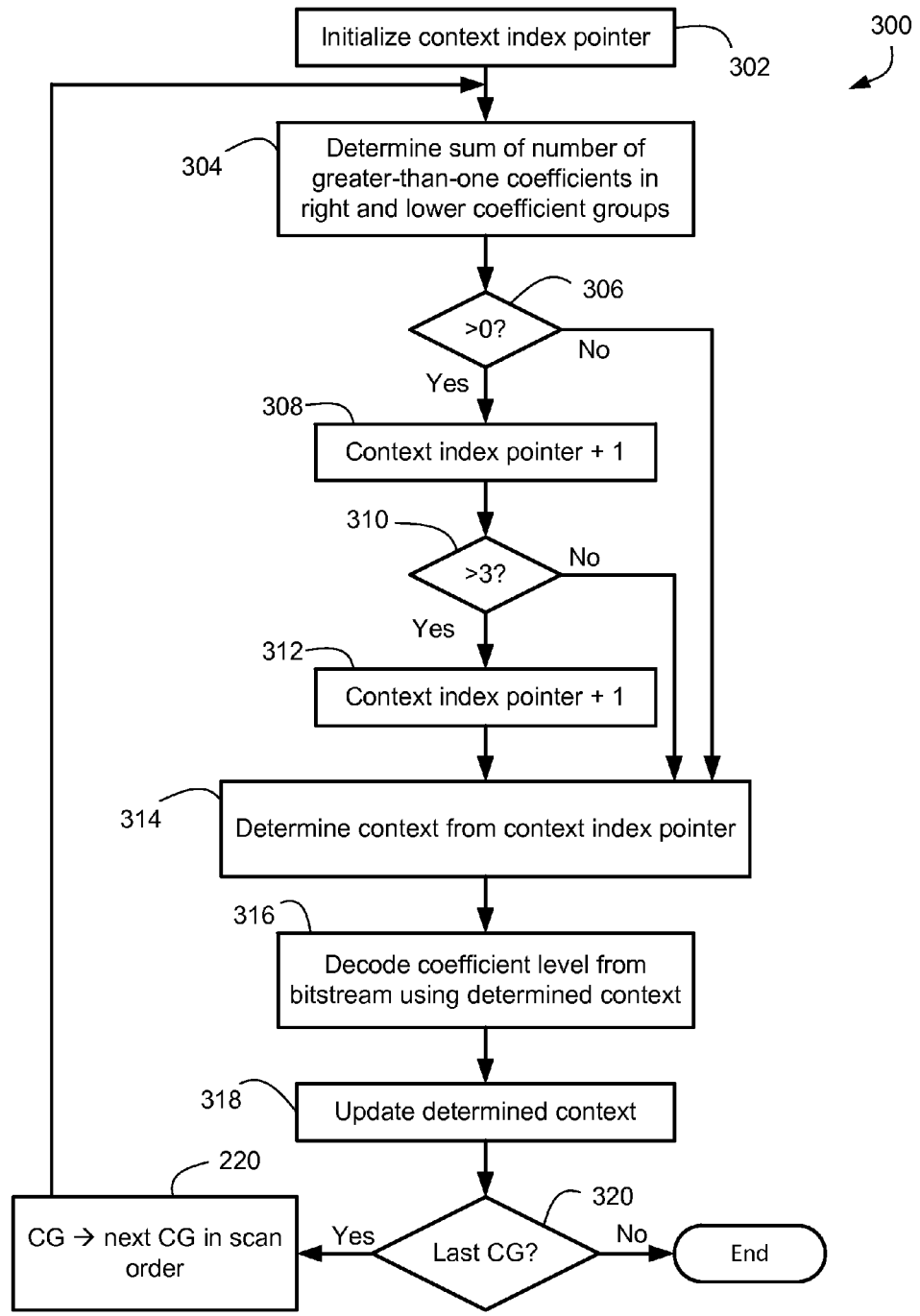
FIG. 5 shows an example method, in flowchart form, for decoding coefficient level data.

Reference is now made to FIG. 5, which shows an example process 300 for decoding coefficient level data using a context-based entropy decoder. This process 300 may be applied in the case of determining context for decoding of "greater-than-one" coefficient level flags, "greater-than-two" coefficient level flags, "level-minus-three" coefficient level data, or some or all of these. Suitable modification for specific implementation will be appreciated by those skilled in the field in view of the discussion herein.

In operation 302, a context index pointer is initialized. In general, the decoder may maintain a number of contexts or context sets and the current or selected context set may be identified using the context index pointer, in some embodiments. The value to which the context index pointer is initialized depends on the implementation and order in which the contexts are organized.

In operation 304, the decoder determines the sum of the number of greater-than-one coefficients from the right-neighbor coefficient group and from the lower-neighbor coefficient group. This value may be denoted Q_sum. If Q_sum is determined to be greater than zero in operation 306, then in operation 308 the context index pointer is incremented by one. If the value Q_sum is found to be greater than three in operation 310, the in operation 312 the context index pointer is incremented by one again.

In operation 314, the context index pointer is used to identify the current context (or context set in some embodiments), and in operation 316 that identified context is used to decoder coefficient levels from the bitstream of encoded data. This may include decoding the greater-than-one coefficient level flags for the current coefficient group. In some embodiments it may also or alternatively include decoding the greater-than-two flags. In yet other embodiments it may also or alternatively include decoding the coefficient-level-minus-three values.

In operation 318, the identified context is updated based on the decoded data. If it is determined, in operation 320, that this is the last coefficient group, then the process 300 exits. Otherwise, the decoder moves to the next coefficient group in the group-level scan order in operation 322 and returns to operation 304 to decode the coefficient levels for the next coefficient group.

An example syntax for implementing a revised context determination for coefficient level coding is provided below. This example syntax is but one possible implementation for determining the context index increment for identifying the context to be used in decoding the greater-than-one coefficient flags (syntax element coeff_abs_level_greater1_flag).

Inputs to this example process are the color component index cIdx, the 16 coefficient subset index i and the current coefficient scan index n within the current subset. In this example, the term coefficient subset corresponds to the term coefficient group used in the above discussion. The output of this process is context index increment ctxIdxInc, which corresponds to the context index pointer discussed in the above example.

The variable ctxSet specifies the current context set and for its derivation the following applies. The following applies when n is equal to 15 or all previous syntax elements coeff_abs_level_greater1_flag[pos] with pos greater than n are derived to be equal to 0 instead of being explicitly parsed, i.e. if this is the first coeff_abs_level_greater1_flag in the coefficient group to be decoded from the bitstream:
1. The variable ctxSet is initialized to zero if the current subset index i is equal to 0 or cIdx is greater than 0. Otherwise, if I is greater than zero and cIdx is equal to 0, ten ctxXet is set to 3.
2. When the subset i is not the first one to be processed in the transform unit, the following applies:
   a. If the TU is 4×4 or 8×8, then the variable numGreater1 is set equal to the variable numGreater1 that was derived during the last context derivation for coeff_abs_level_greater2_flag for the subset i+1; if numGreater1>>1 is greater than 0, ctxSet is incremented by one; and if numGreater1>>1 is greater than 3 and cIdx is equal to 0, ctxSet is incremented by one.
   b. If the TU is 16×16 or 32×32, then the variable Q_sum is set equal to the sum of the Q_numGreater1 variables that have been derived for the subsets immediately to the right of subset i and immediately below subset i. If either the right or lower subsets do not exist (i.e., fall outside the boundary of the TU), their respective Q_numGreater1 variables are assumed to be 0; if Q_sum is greater than 0, ctxSet is incremented by one; and if Q_sum is greater than 3, ctxSet is incremented by one.
3. The variable greater1Ctx is set equal to 1.

In the case where the flag is not the first to be decoded in the coefficient group, i.e. coeff_abs_level_greater1_flag[n] is not the first to be parsed within the current subset i), then for the derivation of ctxSet and greater1Ctx the following applies:
1. The variable ctxSet is set equal to the variable ctxSet that has been derived during the last use of this process.
2. The variable greater1Ctx is set equal to the variable greater1Ctx that has been derived during the last use of this process.
3. When greater1Ctx is greater than 0, the variable lastGreater1Flag is set equal to the syntax element coeff_abs_level_greater1_flag that has been used during the use of this process and greater1Ctx is set to 0 if lastGreater1Flag is equal to 1, otherwise greater1Ctx is incremented by 1 if lastGreater1Flag is equal to 0.

The context index increment ctxIdxInc is derived using the current context set ctxSet and the current context greater1Ctx as follows:
ctxIdxInc=(ctxSet*4)+Min(3, greater1Ctx)
When cIdx is greater than 0, ctxIdxInc is modified as follows:
ctxIdxInc=ctxIdxInc+24

The foregoing syntax illustrates a derivation process for ctxIdxInc in the case of a greater-than-one flag (coeff_abs_level_greater1_flag). Below is a similar example process for deriving ctxIdxInc in the case of a greater-than-two flag (coeff_abs_level_greater2_flag).

Inputs to this example process are the color component index cIdx, the 16 coefficient subset index i and the current coefficient scan index n within the current subset. The output of this process is ctxIdxInc. The variable ctxSet specifies the current context set.

To find ctxSet for the first coefficient processed in the coefficient group, the following process may be used. That is, if n is equal to 15 or all previous syntax elements coeff_abs_level_greater2_flag[pos] with pos greater than n are derived to be equal to 0 instead of being explicitly parsed, the following applies:
1. If the current subset index i is equal to 0 or cIdx is greater than 0, ctxSet is initialized to zero. Otherwise, if i is greater than 0 and cIdx is equal to 0, then ctxSet is initialized to three.
2. If the TU is 16×16 or 32×32, a separate instance of the variable Q_numGreater1 is maintained for each subset.
3. The variable numGreater1 for the first subset is set equal to 0.
4. The variable greater2Ctx is set equal to 0.
5. Assuming that the subset i is not the first one to be processed in the transform unit, the following applies:
   a. If the TU is 4×4 or 8×8, then the variable numGreater1 is set equal to the variable numGreater1 that has been derived during the last use of this process for the subset i+1; then numGreater1=numGreater1>>1; if numGreater1 is greater than 0, ctxSet is incremented by one; and if numGreater1 is greater than 3 and cIdx is equal to 0, ctxSet is further incremented by one.
   b. If the TU is 16×16 or 32×32, then the variable Q_sum is set equal to the sum of the Q_numGreater1 variables that have been derived for the subsets immediately to the right of subset i and immediately below subset i; if either the right or lower subsets do not exist (i.e., fall outside the boundary of the TU), their respective Q_numGreater1 variables are assumed to be 0; if Q_sum is greater than 0, ctxSet is incremented by one; if Q_sum is greater than 3, then ctxSet is further incremented by one.

If the flag is not the first flag in the coefficient group to be processed, i.e. if coeff_abs_level_greater2_flag[n] is not the first to be parsed within the current subset i, then the derivation of ctxSet and greater2Ctx is implemented as follows:
1. The variable ctxSet is set equal to the variable ctxSet that has been derived during the last use of this process.
2. The variable greater2Ctx is set equal to the variable greater2Ctx that has been derived during the last use of this process, incremented by 1.
3. The variable numGreater1 is set equal to the variable numGreater1 that has been derived during the last use of this process, incremented by 1.

If the TU is 16×16 or 32×32 and coeff_abs_level_greater2_flag[n] is last to be parsed within the current subset i, Q_numGreater1 for subset i is set equal to 0 if numGreater1=0, 1 if 0<numGreater1<=3, and 2 otherwise.

The context index increment ctxIdxInc is then derived using the current context set ctxSet and the current context greater2Ctx as follows:
ctxIdxInc=(ctxSet*3)+Min(2, greater2Ctx)
When cIdx is greater than 0, ctxIdxInc is modified as follows:
ctxIdxInc=ctxIdxInc+18

Figure 6:
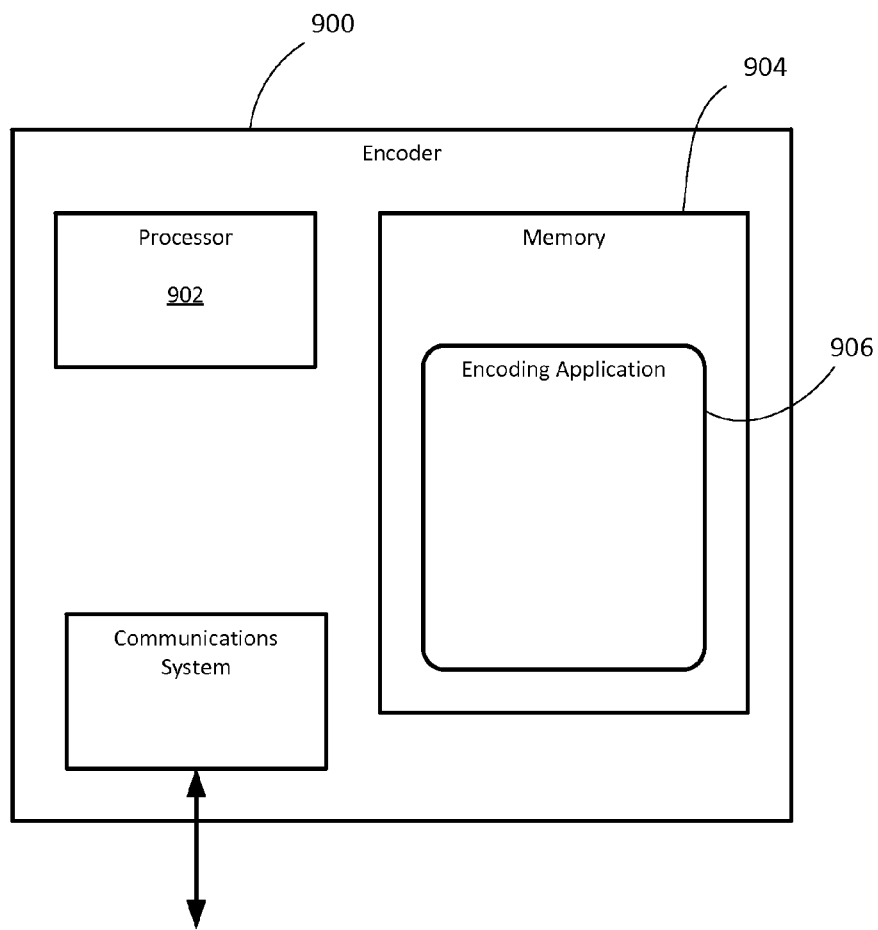
FIG. 6 shows a simplified block diagram of an example embodiment of an encoder.

Reference is now made to FIG. 6, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform operations such as those described herein. For example, the encoding application 906 may encode and output bitstreams encoded in accordance with the processes described herein. It will be understood that the encoding application 906 may be stored in on a computer readable medium, such as a compact disc, flash memory device, random access memory, hard drive, etc.

Figure 7:
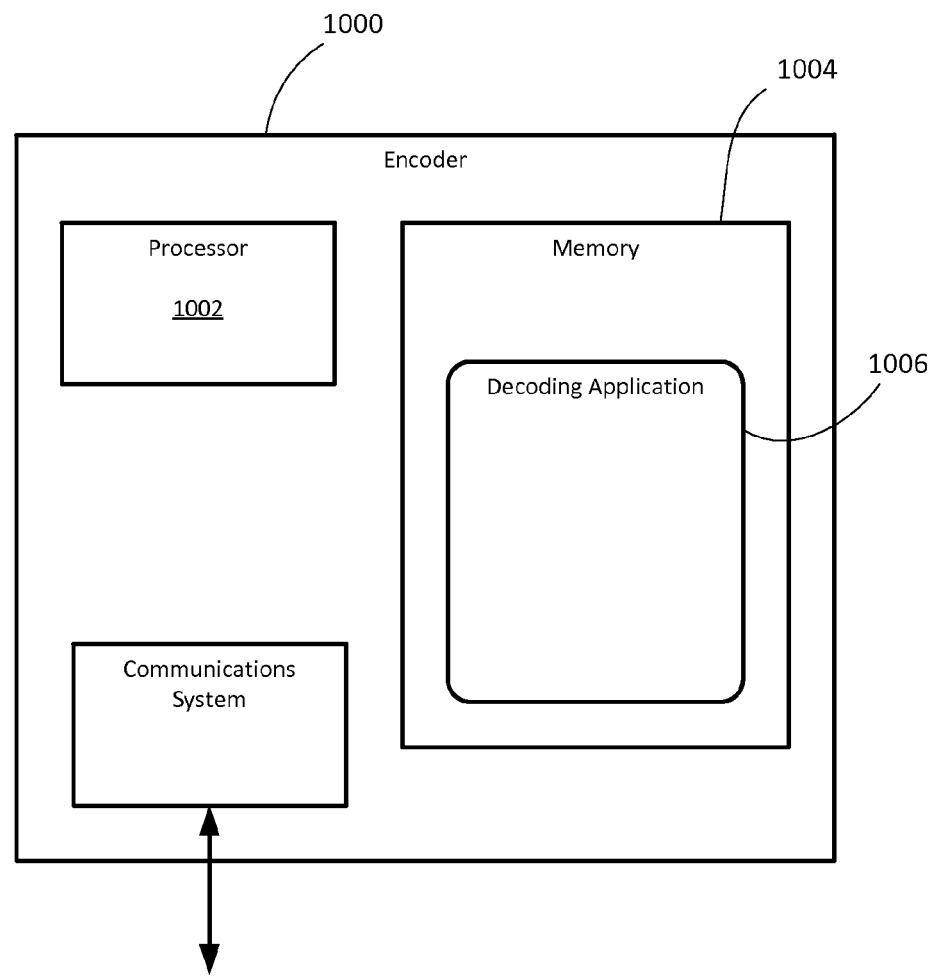
FIG. 7 shows a simplified block diagram of an example embodiment of a decoder.

Reference is now also made to FIG. 7, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform operations such as those described herein. The decoding application 1006 may include an entropy decoder configured to reconstruct residuals based, at least in part, on reconstructing significant-coefficient flags, as described herein. It will be understood that the decoding application 1006 may be stored in on a computer readable medium, such as a compact disc, flash memory device, random access memory, hard drive, etc.

It will be appreciated that the decoder and/or encoder according to the present application may be implemented in a number of computing devices, including, without limitation, servers, suitably programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable non-transitory computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of decoding a bitstream of encoded video by reconstructing significant-coefficient flags for a transform unit, the transform unit being partitioned into a plurality of block-based coefficient groups, the method comprising:
for a significant-coefficient flag within a current coefficient group,
determining whether that significant-coefficient flag is within a right column of the current coefficient group or a bottom row of the current coefficient group and, if so, then selecting a first set of nearby significant-coefficient flag positions relative to that significant-coefficient flag, and otherwise selecting a different, second set of nearby significant-coefficient flag positions relative to that significant-coefficient flag;
determining a context for that significant-coefficient flag from a sum of the selected significant-coefficient flags in the positions in the selected set;
decoding that significant-coefficient flag using its determined context; and
updating the determined context,
wherein the first set of nearby significant-coefficient flag positions comprises one of a plurality of sets of nearby significant-coefficient flag positions relative to that significant-coefficient flag, and wherein each of the plurality of sets excludes significant-coefficient flags from other coefficient groups except for: significant-coefficient flags in the column immediately to the right of the current coefficient group, significant-coefficient flags in the row immediately below the current coefficient group, and a significant-coefficient flag diagonally adjacent the bottom-right corner of the current coefficient group.

2. The method claimed in claim 1, wherein the first set of nearby significant-coefficient flag positions comprises one of a plurality of sets of nearby significant-coefficient flag positions relative to that significant-coefficient flag, and wherein selecting a first set of nearby significant-coefficient flag positions comprises selecting one of the plurality of sets of nearby significant-coefficient flag positions based upon that significant-coefficient flag's location within the right column or in the bottom row.

3. The method claimed in claim 1, wherein selecting a first set of nearby significant-coefficient flag positions comprises selecting the first set of nearby significant-coefficient flag positions based upon a location of that significant-coefficient flag in the current coefficient group.

4. The method claimed in claim 3, wherein the location comprises the bottom-right corner, and wherein the first set includes five significant-coefficient flag positions arranged as:

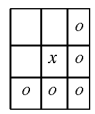

wherein x indicates that significant-coefficient and o indicates the relative location of the nearby significant-coefficient flag positions in the first set.

5. The method claimed in claim 3, wherein the location comprises the right column and not the bottom row, and wherein the first set includes at least four significant-coefficient flag positions arranged as:

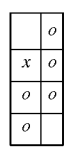

or

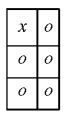

-continued or

|   | o |
|---|---|
| x | o |
|   | o |
| o |   | wherein x indicates that significant-coefficient and o indicates the relative location of the nearby significant-coefficient flag positions in the first set.

6. The method claimed in claim 3, wherein the location comprises the bottom row and not the right column, and wherein the first set includes five significant-coefficient flag positions arranged as:

|   | x | o | o |
|---|---|---|---|
| o | o | o |   | or

| x | o | o |
|---|---|---|
| o | o | o | wherein x indicates that significant-coefficient and o indicates the relative location of the nearby significant-coefficient flag positions in the first set.

7. The method claimed in claim 1, wherein the second set includes five significant-coefficient flag positions arranged as:

| x | o | o |
|---|---|---|
| o | o |   |
| o |   |   | wherein x indicates that significant-coefficient and o indicates the relative location of the nearby significant-coefficient flag positions in the second set.

8. A decoder for decoding a bitstream of encoded data to reconstruct coefficients for a transform unit, the decoder comprising:
a processor;
a memory; and
a decoding application stored in memory and containing instructions for configuring the processor to, for a significant-coefficient flag within a current coefficient group,
determine whether that significant-coefficient flag is within a right column of the current coefficient group or a bottom row of the current coefficient group and, if so, then select a first set of nearby significant-coefficient flag positions relative to that significant-coefficient flag, and otherwise select a different, second set of nearby significant-coefficient flag positions relative to that significant-coefficient flag;
determine a context for that significant-coefficient flag from a sum of the selected significant-coefficient flags in the positions in the selected set;
decode that significant-coefficient flag using its determined context; and
update the determined context,
wherein the first set of nearby significant-coefficient flag positions comprises one of a plurality of sets of nearby significant-coefficient flag positions relative to that significant-coefficient flag, and wherein each of the plurality of sets excludes significant coefficient flag from other coefficient groups except for: significant-coefficient flags in the column immediately to the right of the current coefficient group, significant-coefficient flags in the row immediately below the current coefficient group, and a significant-coefficient flag diagonally adjacent the bottom-right corner of the current coefficient group.

9. The decoder claimed in claim 8, wherein the first set of nearby significant-coefficient flag positions comprises one of a plurality of sets of nearby significant-coefficient flag positions relative to that significant-coefficient flag, and wherein selecting a first set of nearby significant-coefficient flag positions comprises selecting one of the plurality of sets of nearby significant-coefficient flag positions based upon that significant-coefficient flag's location within the right column or in the bottom row.

10. The decoder claimed in claim 8, wherein the processor is configured to select a first set of nearby significant-coefficient flag positions by selecting the first set of nearby significant-coefficient flag positions based upon a location of that significant-coefficient flag in the current coefficient group.

11. The decoder claimed in claim 10, wherein the location comprises the bottom-right corner, and wherein the first set includes five significant-coefficient flag positions arranged as:

|   |   | o |
|---|---|---|
|   | x | o |
| o | o | o | wherein x indicates that significant-coefficient and o indicates the relative location of the nearby significant-coefficient flag positions in the first set.

12. The decoder claimed in claim 10, wherein the location comprises the right column and not the bottom row, and wherein the first set includes at least four significant-coefficient flag positions arranged as:

|   | o |
|---|---|
| x | o |
| o | o |
| o |   | or

| x | o |
|---|---|
| o | o |
| o | o | or

| | o | |
|---|---|---|
| x | o | |
| | o | |
| o | | | wherein x indicates that significant-coefficient and o indicates the relative location of the nearby significant-coefficient flag positions in the first set.

13. The decoder claimed in claim 10, wherein the location comprises the bottom row and not the right column, and wherein the first set includes five significant-coefficient flag positions arranged as:

| | x | o | o |
|---|---|---|---|
| o | o | o | | or

| x | o | o |
|---|---|---|
| o | o | o | wherein x indicates that significant-coefficient and o indicates the relative location of the nearby significant-coefficient flag positions in the first set.

14. The decoder claimed in claim 8, wherein the second set includes five significant-coefficient flag positions arranged as:

| x | o | o |
|---|---|---|
| o | o | |
| o | | | wherein x indicates that significant-coefficient and o indicates the relative location of the nearby significant-coefficient flag positions in the second set.

15. A non-transitory processor-readable medium storing processor-executable instructions which, when executed, configures one or more processors to perform the method claimed in claim 1.

16. A method of decoding a bitstream of encoded video by reconstructing significant-coefficients for a transform unit, the transform unit being portioned into a plurality of contiguous coefficient groups, the method comprising:
   for each significant-coefficient flag within a coefficient group,
      determining a context for that significant-coefficient flag based on a sum of a plurality of nearby significant-coefficient flags, wherein the nearby significant-coefficient flags exclude any significant-coefficient flags outside the coefficient group except for significant-coefficient flags in the column immediately to the right of the coefficient group, significant-coefficient flags in the row immediately below the coefficient group, and a significant-coefficient flag diagonally adjacent the bottom-right corner of the coefficient group;
   decoding that significant-coefficient flag using its determined context; and
   updating the determined context.

* * * * *